Nov. 13, 1945. A. E. SCHUBERT 2,389,087
AUTOMATIC ADJUSTMENT OF LENS DIAPHRAGM
Filed Dec. 6, 1941 2 Sheets-Sheet 1
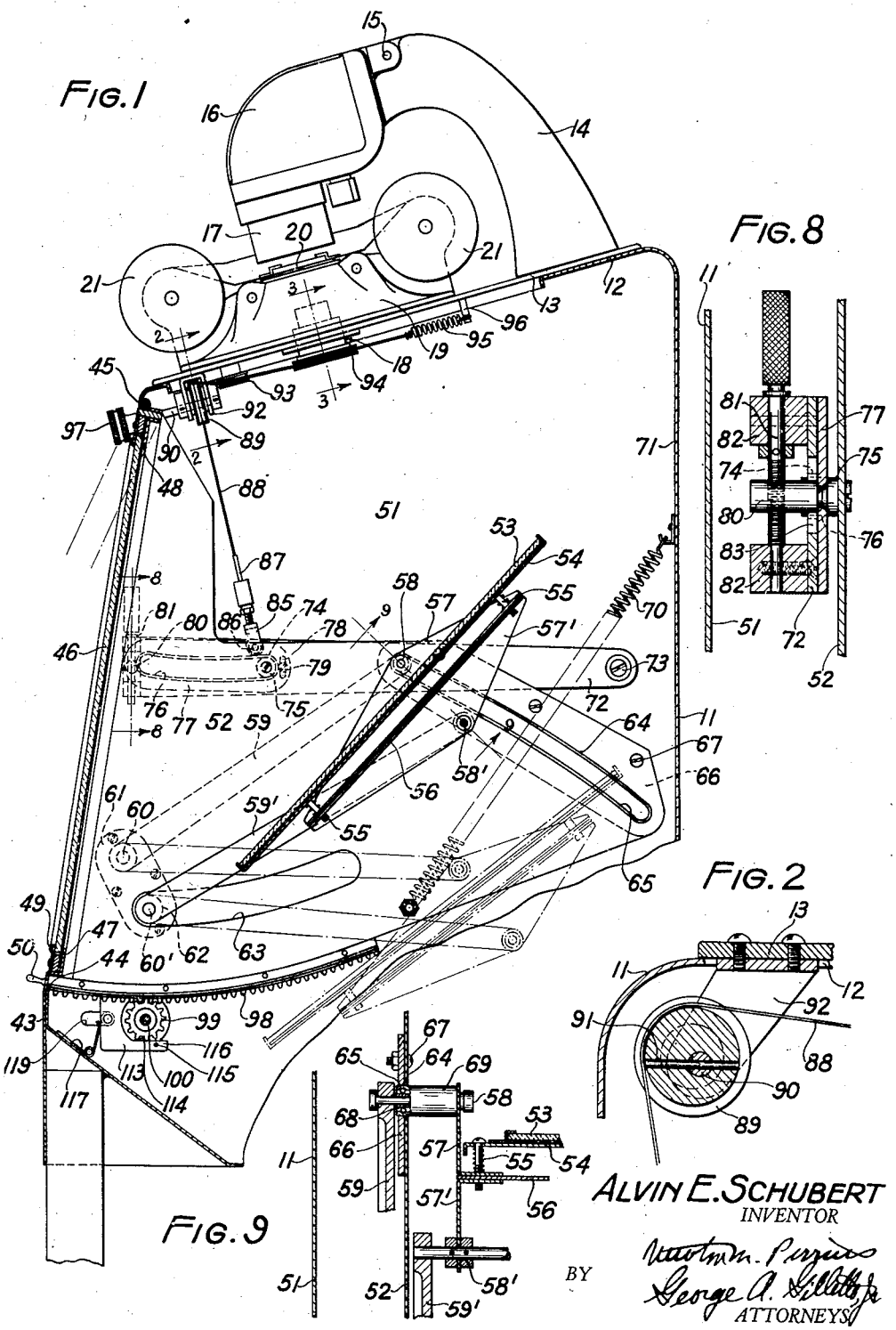
ALVIN E. SCHUBERT
INVENTOR
BY
ATTORNEYS Nov. 13, 1945. A. E. SCHUBERT 2,389,087
AUTOMATIC ADJUSTMENT OF LENS DIAPHRAGM
Filed Dec. 6, 1941 2 Sheets-Sheet 2
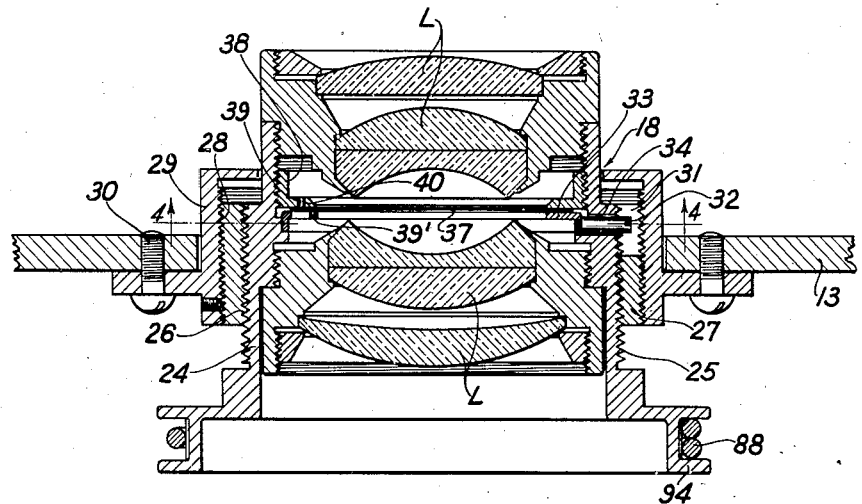
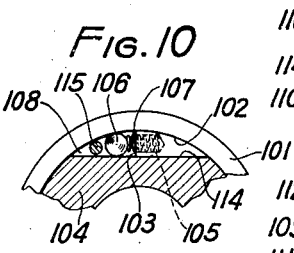
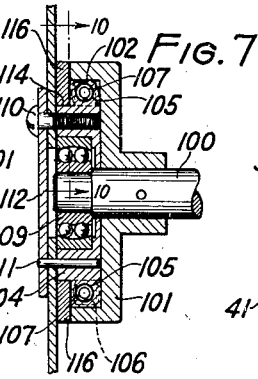
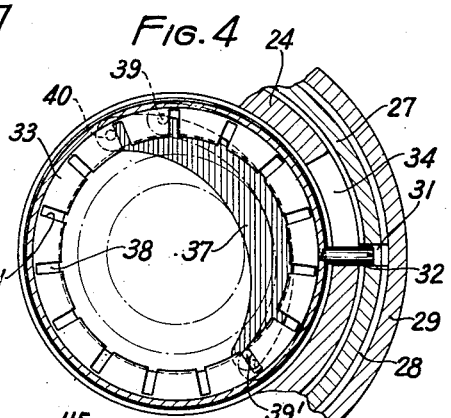
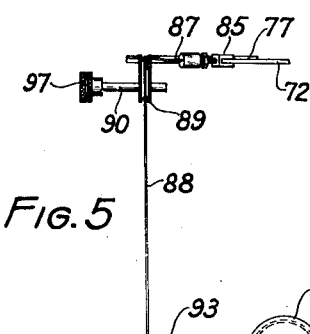
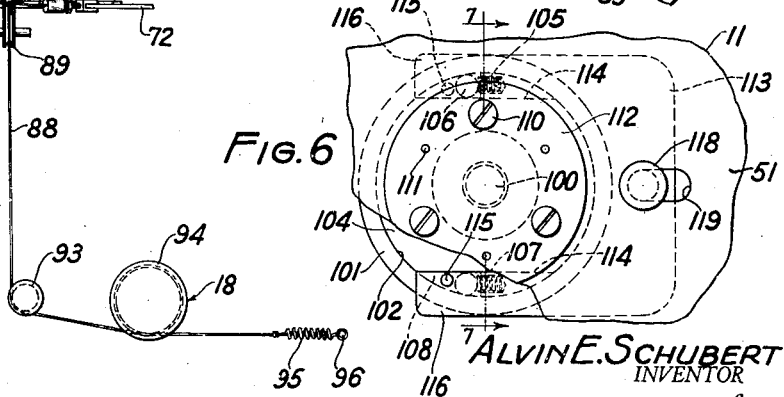
Alvin E. Schubert
INVENTOR Patented Nov. 13, 1945

2,389,087

UNITED STATES PATENT OFFICE 2,389,087

AUTOMATIC ADJUSTMENT OF LENS DIAPHRAGMS

Alvin E. Schubert, Rochester, N. Y., assignor to Eastman Kodak Company, Rochester, N. Y., a corporation of New Jersey Application December 6, 1941, Serial No. 421,943

12 Claims. (Cl. 88—24)

This invention relates to photographic projection apparatus and more particularly to an apparatus in which the lens diaphragm is automatically controlled by an automatically focused lens.

The primary object of the invention is to provide a projection system which will give the same image brightness for all magnifications.

A further object of the invention is to provide a lens diaphragm that will be automatically operated by any change in magnification to give the same image brightness for all magnifications.

A still further object is to provide a projection system that will be automatically focused for any change in magnification and will automatically adjust the lens diaphragm in direct relationship to the change in focus to give the same image brightness for all magnifications.

And yet another object is to provide an operating connection between the image receiving member and the projection system whereby movement of the image receiving member to change the magnification will automatically focus the projection lens and, thereby change the lens diaphragm opening to give the same image brightness.

Another object is to provide an operating connection between the lens diaphragm and the focusing means for the projection lens, whereby a change in focus due to a change in the magnification will vary the diaphragm opening in direct proportion to the variation in the image magnification to maintain the same image brightness for all magnifications.

And still another object is to provide an apparatus of the type described which is easy to operate, cheap to manufacture, and efficient in operation.

Other and further objects of the invention will be suggested to those skilled in the art by the description which follows.

The above and other objects are embodied in a photographic projection apparatus having a casing with a supporting wall, a support member fixed to the supporting wall, a projection lens, a mounting means movable to change the length of the optical path, an image receiving member, an operating connection between the image receiving member and the projection lens, and a second operating connection between the focusing barrel of the projection lens and the diaphragm in the projection lens mount, so that a variation in the diaphragm opening will be made in direct proportion to the change in magnification and focus of the projection lens.

Reference is hereby made to the accompanying drawings wherein like reference characters designate similar parts and wherein:

Fig. 1 is a side elevation, partially in section, of the photographic projection apparatus described herein;

Fig. 2 is a sectional view, taken substantially on the line 2—2 of Fig. 1, showing the eccentric mounting of the hand focusing knob;

Fig. 3 is a vertical section, taken substantially on the line 3—3 of Fig. 1, of the projection lens assembly;

Fig. 4 is a sectional view, taken substantially on the line 4—4 of Fig. 3, showing the arrangement and operating means for the diaphragm blades;

Fig. 5 is a diagrammatic plan view of the connecting means between the lens mount and the image receiving member;

Fig. 6 is a side elevation of the locking mechanism for the image receiving member;

Fig. 7 is a sectional view, taken substantially on the line 7—7 of Fig. 6.

Fig. 8 is a sectional view, taken substantially on the line 8—8 of Fig. 1, showing the adjustment of the cam plate for the connecting means.

Fig. 9 is a sectional view, taken substantially on the line 9—9 of Fig. 1, showing the arrangement for mounting the mirror.

Fig. 10 is a partial sectional view, taken substantially on the line 10—10 of Fig. 7.

When an object is projected onto a screen at a known distance, the resulting image will be a given magnification of the projected object. If the distance is varied by moving the screen either away from or toward the projection lens, the image size or magnification of the projected object will also be varied, as well as the screen brightness which varies according to the inverse square of the distance, as is well known by those skilled in the art, and with every change of the screen with respect to the projection lens, the lens will have to be focused. However, by varying the aperture of the projection lens in direct proportion to the change in the distance of the screen with respect to the projection lens, the image on the screen will have the same brightness for all magnifications. I have accomplished this result by providing a connecting means between the movable screen and lens mount and a second connecting means between the lens mount and a diaphragm carried by the lens mount, so that movement of the screen either toward or away from the projection lens will automatically focus the lens and change the diaphragm opening to obtain the same illumination for all magnifications possible by the illustrated embodiment of the invention.

In the illustrated embodiment of the invention, the photographic projection apparatus comprises a casing 11 having an inclined top or supporting surface 12 to which is fixed a mechanism supporting plate 13. The bracket 14 is mounted on the plate 13 and has pivotally mounted thereon, at 15, the housing 16 which contains the usual light source, not shown, and the usual condenser lens system which is mounted in the extension 17 for directing a beam of light downwardly into the projection lens system, broadly designated by the numeral 18. A cap or frame 19 is rotatably mounted on the plate 13 directly below the extension 17 and supports the film gate 20 and the film reels 21. A more detailed description of the above mentioned structure may be obtained by referring to United States Patent No. 2,304,921, in the name of Roy S. Hopkins and dated December 15, 1942.

The projecting system comprises a plurality of lenses L mounted in the sleeve 24, see Fig. 3. The sleeve 24 has a threaded portion 25 adapted to mate with a similar threaded opening 26 on the inside of the sleeve 27 which is threaded on the outside to engage the threaded opening 28 in the supporting member 29. The supporting member 29 is fixed to the plate 13 by the screws 30. The sleeve 27 is provided with an axial slot 31 for engaging an operating pin 32 carried by the diaphragm supporting ring 33. The pin 32 is held against movement by the axial slot 31, and the sleeve 24 is provided with an accurate slot 34 through which the pin 32 extends, as shown in Fig. 4.

The adjustable diaphragm comprises a plurality of arcuate shaped blades 37 which are mounted between the diaphragm ring 33 and the ring 38 which is threaded into the sleeve 24. The blades 37 are provided with two pins 39 and 39' fixed to the extremity of the blades but extending in opposite directions therefrom, as is well known by those skilled in the art. The pins 39 engage a series of holes 40 in the sleeve 28, and the pins 39' engage a series of slots 41 in the diaphragm ring 33, as shown in Figs. 3 and 4. As the sleeve 24 is rotated and moved axially for focusing, the pin 32 will hold the diaphragm ring 33 stationary due to the slot 31 in the sleeve 27 but will move vertically with the lens mount due to the slot 34 in the sleeve 24, and the ring 38, being threaded to the sleeve 24, will rotate therewith together with the pins 39 causing the pins 39' to move along the radial slots 41 to a position such as is shown in Fig. 4 by the dot-dash lines, the purpose of which will be described hereinafter.

The front wall 43 of the casing 11 is provided with a large aperture 44 at the top of which, as shown at 45, the image receiving member is hinged for movement. The image receiving member comprises a translucent screen 46 mounted between a rectangular frame member 47 having an aperture 48 and the complementary shaped clamping member 49, and has mounted thereon, a suitable handle 50 for moving the image receiving member. The frame member 47 has fixed thereto, adjacent the side walls 51 of the casing 11, two plates 52, the shape of which is best shown in Fig. 1, for enclosing the opening between the image receiving member and the front wall when the image receiving member is moved to an extended position when a change in magnification is desired.

In order to vary the magnification, it is necessary to vary the distance of the optical path which is accomplished in the present instance by the mounting means which moves the receiving member with respect to the projection lens. As the screen is moved with respect to the projection lens, it is also necessary to vary the position of the reflecting means in order to maintain a centrally located image on the screen. To accomplish this result, the mirror 53 is mounted on a supporting plate 54 which is mounted on the studs 55 carried by the plate 56. The plate 56 is fixed between a set of brackets 57 and 57' to which are pivotally connected at 58 and 58' the levers 59 and 59', respectively, as shown in Fig. 9. The levers 59 and 59' are pivotally connected at 60 and 60', respectively, to a bracket 61 secured to the inside of the side wall 51, and it will be noted, as shown in Figs. 1 and 9, that the lever 59 lies between the side wall 51 and the plate 52, whereas the lever 59' is mounted on a bushing 62 that extends through the slot 63 in the plate 52 so as to place it between the bracket 57' and the plate 52. The plate 52 has a clearance slot 64 which is complementary in shape to a cam slot 65 in the plate 66 fixed thereto by the screws 67. A ball bearing 68 engages the cam slot 65 and is mounted between the end of the lever 59 and the spacer bushing 69 for the bracket 57, as shown in Fig. 9, the purpose of which will be described hereinafter. A spring 70 is fixed to the plate 52 and to the rear wall 71 to counteract the weight of the image receiving member.

The interconnecting means between the image receiving member and the projection lens comprises an arm 72 that is pivotally mounted on the side wall 51 at 73 and has a clearance slot 74 for the roller 75 carried by the plate 52 for engaging the cam slot 76 in the plate 77. The plate 77 is mounted on the arm 72 in such a manner that the position of the plate may be readily adjusted in assembly for any discrepancies in the focal length of the lenses. This adjustment is accomplished by providing an elongated slot 78 in one end of the plate 77 and holding the plate in place by the screw 79. The other end of the plate 77 carries a stud 80 that has a threaded hole to receive a threaded stud 81 mounted in the blocks 82 fixed to the plate 77, the stud 80 extending through the vertical slot 83 in the arm 72, see Fig. 8. The connecting means comprises a yoke member 85 that is pivotally connected to the arm 72 at 86 and carries a member 87 that is adjustable on the yoke member 85 and has one end of the cable 88 fixed thereto. The cable 88, see Fig. 5, passes over a pulley 89 that is fixed, by the pin 91, to the shaft 90 which is journalled in the bracket 92 fixed to the supporting surface 12. The cable 88 also passes over the guide pulley 93 carried by the plate 13 and encircles the flanged periphery 94 of the sleeve 24. The other end of the cable 88 is fixed to a spring 95 anchored to the pin 96 on the mechanism plate 13 which tends to reduce any backlash in the movement of the focusing members.

In order to provide a manual adjustment of the focusing means, the pulley 89 is eccentrically mounted on the shaft 90, see Fig. 2, which extends to the outside of the front wall 43 and has a knob 97 mounted thereon. As the knob 97 is turned, the arm 72 being held stationary, the tension on the cable 88 will be increased or decreased depending on the direction of rotation due to the eccentric mounting of the pulley 89, and this difference will be taken up by the spring 95 which will cause the focusing means to be rotated a very small amount.

When the image receiving member has been moved to its proper position, a two way locking mechanism, as shown in Figs. 6, 7 and 10, locks the member in position against accidental movement. The image receiving member has mounted thereon, the gear segment 98 which meshes with a spur gear 99 fixed to the shaft 100. The shaft 100 has fixed thereto, a casing 101 which is provided with an opening 102 adapted to form, together with the milled steps 103 in the stationary plate 104, recesses 105 for the rollers 106 which are wedged against the periphery of the opening 102 and the milled step 103 by the springs 107 seated in the recesses 108 in the sides of the milled steps 103, and provides, in effect, a two way clutch. The plate 104 is mounted adjacent the side wall 51 on the bearing 109 in which the end of the shaft 100 is journalled and is fixed against rotation by the screws 110 and the pins 111 which extend through the cover plate 112 and the side wall 51. A plate 113 is slidably mounted between the side wall 51 and the casing 101 on the milled flats 114 on the plate 104, is provided with two pins 115, fixed to the extensions 116, which extend into the recesses 105, and is held in a neutral position by the spring 117. A knob 118 is also mounted on the plate 113 and extends through the slot 119 in the side wall 51 for the purpose which will be hereinafter described.

The operation of the above described apparatus will now be described. To vary the magnification of the image on the image receiving member, the operator must first release the locking mechanism and then, holding the locking mechanism in its released position, move the image receiving member to the position which will give the desired magnification. To release the locking mechanism the operator must pull the knob 118 toward the front wall 43 against the action of the spring 117. As the knob is moved, the plate 113 will also be moved and the pins 115 will engage the rollers 106 drawing them out of engagement with the casing 101 and the steps 103 against the action of the springs 107. As soon as the rollers 106 are free, the image receiving member can be moved to the desired position by the handle 50.

As the image receiving member is moved outwardly, from the position shown in Fig. 1, the roller 75, which engages the cam slot 76 in the plate 77, will move the arm 72 about its pivot 73, and the yoke 85 will be moved downward carrying therewith the cable 88. As the cable 88 is moved, the turn of the cable about the flange periphery 94 will rotate the lens sleeve 24 in the threaded sleeve 27, to move the lenses L for the proper focusing adjustment. As the sleeve 24 is rotated, the diaphragm ring 33 will remain stationary, due to the operating pin 32 being held by the slot 31 in the sleeve 27, and the diaphragm blades 37 will be opened by the rotation of the ring 38 with the lens sleeve 24, as shown by the dot-dash lines in Fig. 4.

The plate 66, which is moved forward with the side plate 52, will rotate the levers 59 and 59' about their respective pivots 60 and 60' through the contact of the bearing 68 with the cam slot 65, and position the mirror 53 with respect to a new position of the image receiving member, as shown by the dot-dash lines in Fig. 1. It is to be understood that the parts, as shown in Fig. 1, for positioning the mirror are duplicated on the side wall, which is not shown, to obtain a uniform and smoothly working structure. When the image receiving member has been set in its new position, the knob 118 can be released and the spring 117 will return the plate 113 to its proper position, whereby the pins 115 will allow the rollers 106 to be wedged into a locking position by the springs 107, thereby locking the shaft 100 against rotation.

It is obvious that other mechanical arrangements may be used or provided, and the photographic projection apparatus disclosed herein is merely illustrative.

Having now particularly described my invention, what I desire to secure by Letters Patent of the United States and what I claim is:

1. In a photographic projection apparatus, the combination with a projection lens, an image receiving member movable with respect to said lens to vary the image magnification, a diaphragm member having an opening through which the image beam is projected onto said image receiving member, and a mount rotatably supporting said diaphragm member, of a connecting means actuated by movement of said image receiving member and rotating said diaphragm member to vary the opening therein in direct proportion to the change in image magnification caused by movement of said image receiving member.

2. In a photographic projection apparatus, the combination with an image receiving member, a projection lens assembly for projecting an image beam onto said image receiving member, a mounting means supporting said image receiving member for movement to change the length of the optical path and the image magnification between said lens and said image receiving member, a lens mount supporting said projection lens for movement to focus its image upon said image receiving member, and an adjustable diaphragm member mounted on said projection lens assembly, connected to said lens mount, and having an opening through which said image beam is projected, of a connecting means operated by movement of said mounting means and moving said projection lens with respect to said lens mount to focus said lens upon said image receiving member, and for moving said diaphragm member with respect to said lens mount to vary the opening therein in direct proportion to the change in magnification and to maintain the brightness on said image receiving member constant for all magnifications.

3. In a photographic projection apparatus, the combination with an image receiving member, a projection lens assembly for projecting an image beam onto said image receiving member, a mounting means supporting said image receiving member for movement to change the length of the optical path and the image magnification between said lens and said image receiving member, and an adjustable diaphragm member having a variable opening and mounted in such position that said image beam is projected through said opening, of a motion transmitting means operated by movement of said image receiving member to vary the image magnification and moving said adjustable diaphragm member to vary the opening therein in direct proportion to the change in magnification and to maintain the same brightness on said image receiving member for all magnifications.

4. In a photographic projection apparatus, the combination with an object holder, a lens associated therewith, a screen member, a light source for illuminating an object in said holder whereby an image beam is projected by said lens onto said screen member, and mounting means supporting said screen member for movement along the axis of said lens to change the length of the optical path between said lens and said screen member and to vary the image magnification on said screen member of a diaphragm member having an opening through which the image beam is projected onto said screen member, and a connecting means actuated by movement of said screen member with respect to said lens to change the length of said optical path and to vary the image magnification and operating said diaphragm member to change the opening therein in such direct proportion to the change in image magnification that the image brightness is the same for all magnifications.

5. In a photographic projection apparatus, the combination with an object holder, a lens associated therewith, a screen member composed of translucent material, a light source for illuminating an object in said holder whereby an image beam is projected by said lens onto said screen member and transmitted therethrough, and mounting means supporting said screen member for movement along the axis of said lens to change the length of the optical path between said lens and said screen member and to vary the image magnification on said screen member of a diaphragm member having an opening through which the image beam is projected onto said screen member, and a connecting means actuated by movement of said screen member with respect to said lens to change the length of said optical path and to vary the image magnification and operating said diaphragm member to change the opening therein in such direct proportion to the change in image magnification that the image brightness is the same for all magnifications.

6. In a photographic projection apparatus, the combination with a casing having a supporting wall, a support member fixed to said supporting wall and provided with an opening, a projection lens member including a lens barrel and lens elements, an image receiving member movable with respect to said lens member to vary the image magnification, and a focusing means between said mounting member and said lens barrel for focusing said lens elements on said image receiving member, of a diaphragm member on said projection lens member and having an opening through which an image beam is projected onto said image receiving member, and a connection between said diaphragm member and said support member for changing the opening of said diaphragm member and arranged so that movement of said focusing means causes a change in the opening of said diaphragm member such that illumination of the image beam on said image receiving member is the same for each magnification.

7. In a photographic projection apparatus, the combination with a projection lens assembly for projecting an image beam onto a relatively displaceable surface and having a threaded portion, and a lens mounting provided with a threaded opening for engaging the threaded portion of said lens assembly, of a diaphragm means mounted on said projection lens assembly, provided with an opening through which said image beam is projected, and having a part relatively movable to vary said opening and engaging said lens mounting, the lead of the threads of said threaded portion and said threaded opening being such that rotation of said lens assembly to focus the same on said surface also relatively moves said part of the diaphragm means to change the opening therein to maintain a constant image brightness on said surface for all focusing positions of said lens assembly.

8. In a photographic projection apparatus, the combination with a casing having a supporting wall, a support member fixed to said supporting wall and provided with a threaded opening and with a slot, a projection lens member including lens elements and a threaded lens barrel engaging said threaded opening, and an image receiving member movable with respect to said lens member to vary the image magnification, said lens barrel being rotated to focus said projection lens member on said image receiving member, of a diaphragm member on said lens barrel, having an opening through which an image beam is projected onto said image receiving member, and having an operating pin extending into said slot in said threaded opening, the lead of the threads in said opening and on said lens barrel being related to the operating movement of the pin of said diaphragm member so that the opening thereon is varied by the focusing movement of said projection lens member to maintain a constant image illumination on said image receiving member for all magnifications.

9. In a photographic projection apparatus, the combination with a casing having a supporting wall, a support member fixed to said supporting wall and provided with an opening, a projection lens member including a lens barrel and lens elements, an image receiving member movable with respect to said lens member to vary the image magnification, and a focusing means between said mounting member and said lens barrel for focusing said lens element on said image receiving member, of a diaphragm member on said projection lens member and having an opening through which an image beam is projected onto said image receiving member, an interconnecting means between said image receiving member and said projecting lens member and for automatically moving the same into focusing position with respect to said image receiving member for its different image magnifications, and a connection between said diaphragm member and said support member for changing the opening of the said diaphragm member to provide constant illumination of the image beam on said image receiving member for each magnification.

10. In a photographic projection apparatus, the combination with a stationary mount provided with a threaded opening and with a longitudinal slot, and a projection lens member including lens elements and a threaded lens barrel engaging said threaded opening, of a diaphragm member mounted on said lens barrel, adjustable to vary the diaphragm opening, and having an operating pin extending into said slot whereby rotation of said lens barrel simultaneously focuses said projection lens member and changes the opening of said diaphragm member.

11. In a photographic projection apparatus, the combination with a stationary mount provided with a threaded opening and with a longitudinal slot, and a projection lens member including lens elements and a threaded lens barrel engaging said threaded opening, of a diaphragm member including two relatively movable rings and a plurality of intermediate blades defining an opening, one of said rings being mounted on said lens barrel, and an operating pin attached to the other of said rings and extending into the slot in said mount so that rotation of said lens barrel moves the first mentioned ring with respect to the others and changes the positions of said intermediate blades and the size of the diaphragm opening.

12. In a photographic projection apparatus, the combination with a casing having a supporting wall, a support member fixed to said supporting wall and provided with an opening, a projection lens member including a lens barrel and lens elements, and an image receiving member movable with respect to said lens member to vary the image magnification, said lens barrel being rotated for focusing adjustment thereof, of an interconnecting means including a flexible cord encircling said lens barrel and connected to be moved by movement of said image receiving member, and a guiding assembly for said cord and including a pulley encircled by said cord and an eccentric bearing support for said pulley which bearing support is rotatable to change the position of said pulley and vary the length of the path of said cord for correcting the automatic focusing adjustment of said projection lens.

ALVIN E. SCHUBERT.